Nov. 14, 1939.                H. N. MARTIN                2,179,877
                          TAIL WHEEL ASSEMBLY
                         Filed Sept. 20, 1937            2 Sheets-Sheet 1
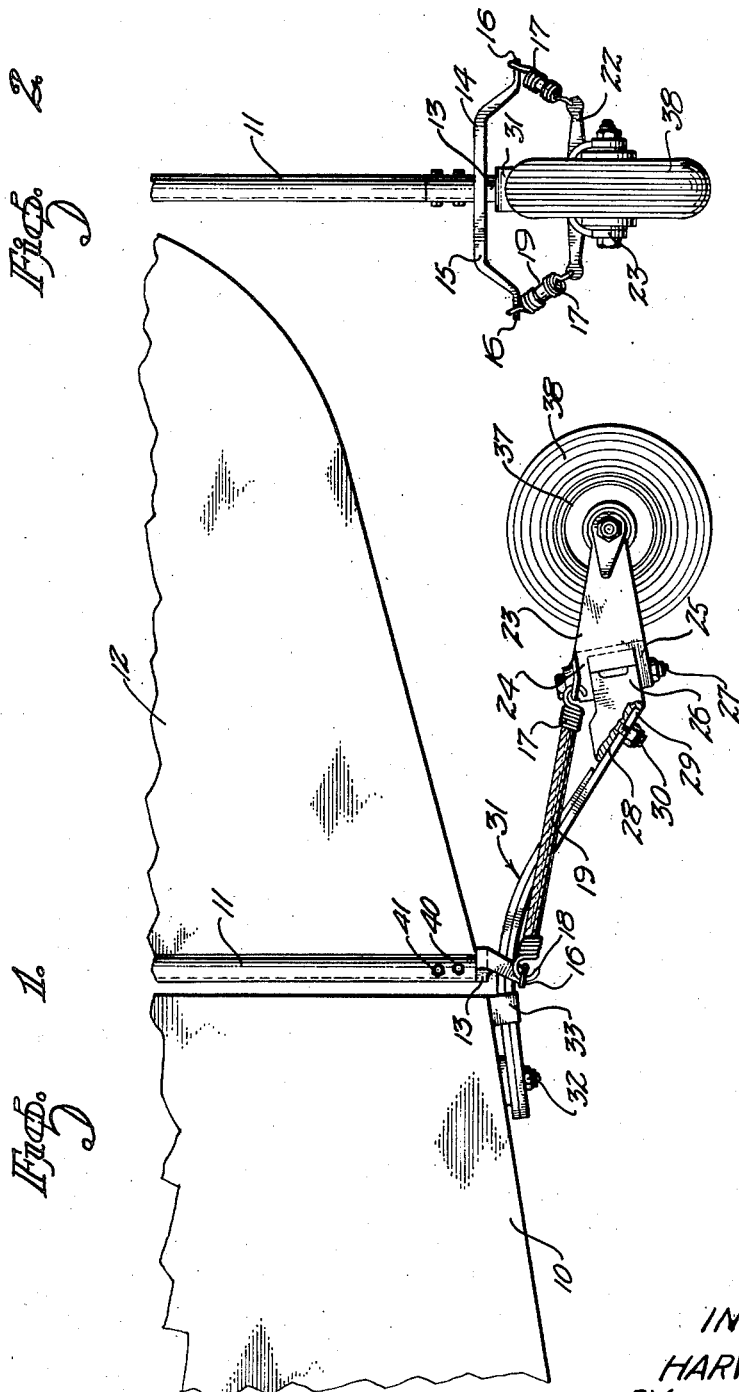
INVENTOR
HARVEY N. MARTIN
BY
James N. Abbett
ATTORNEY

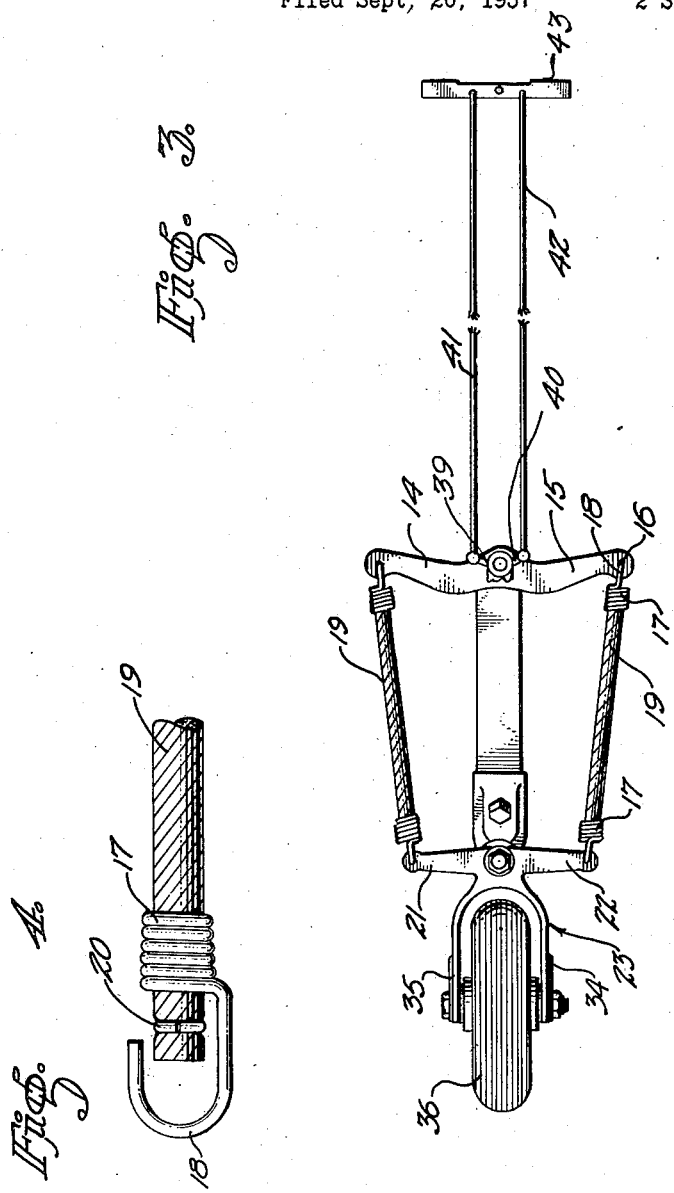

Patented Nov. 14, 1939

2,179,877

UNITED STATES PATENT OFFICE 2,179,877

TAIL WHEEL ASSEMBLY

Harvey N. Martin, Long Beach, Calif.

Application September 20, 1937, Serial No. 164,719

4 Claims. (Cl. 244—109)

This invention relates to aircraft construction and particularly pertains to a tail wheel assembly.

In airplane construction it is common practice to include a tail skid shoe and spring as a part of the landing gear, the said shoe and spring being mounted at the rear end of the fuselage. In this type of construction the plane can only be steered after landing by swinging the rudder, and due to the fact that the skid shoe is a relatively rigid member which slides upon the ground it is difficult to properly control the plane in steering it as it is advanced and turns on the landing field. It is the principal object of the present invention to provide a structure adapted to be mounted and used in connection with the skid shoe spring and within which structure is incorporated a ground wheel mounted for swinging movement around a relatively vertical pivot, and which wheel may be yieldably controlled to swing in unison with the rudder in rendering the aircraft mobile after it has landed upon the field.

The present invention contemplates the provision of a bearing block adapted to be mounted upon the tail skid spring as a substitute for the tail shoe and which block pivotally supports a wheel fork being operatively connected with the rudder torque tube to insure that as the rudder torque tube is controlled the wheel and the rudder will swing in unison to steer the airplane.

The invention is illustrated by way of example in the accompanying drawings in which:

Figure 1 is a fragmentary view in side elevation indicating a portion of an airplane fuselage and its rudder and showing the manner of assembly of the present invention therewith.

Fig. 2 is a view in end elevation showing the parts of Fig. 1, and particularly discloses the tail skid structure with which the present invention is concerned.

Fig. 3 is a view in plan showing the tail skid structure and indicating generally the usual means for controlling the rudder of the airplane and the structure with which the present invention is concerned.

Fig. 4 is an enlarged fragmentary view showing a method of connecting the flexible shock cords.

Referring more particularly to the drawings, 10 indicates the rear end of the fuselage of an airplane. Suitably mounted upon a vertical pivot at the rear end of the fuselage is a rudder torque tube 11 carrying a rudder 12. This torque tube is mounted upon a rudder mast 13 which is formed with a pair of outwardly diverging arms 14 and 15 shown in Fig. 2 of the drawings as having portions extending downwardly and outwardly at their ends to provide eye portions 16. These eye portions receive shock cord fittings 17 provided as shown in Fig. 4 of the drawings with end hooks 18. The fittings 17 are preferably coiled around shock cords 19 which are made of strong resilient material and are provided adjacent their ends with rings 20 to prevent the ends of the cords from pulling out of the fittings. Fittings 17 are provided at each end of shock cords 19. The opposite fittings from those described as engaging the eyes 16 of the rudder mast arms 14 and 15 engage eyes in arms 21 and 22 of a wheel fork 23. As here shown the lengths of the arms 21 and 22 are shorter than the lengths of the arms 14 and 15. The wheel fork 23 is provided with a pair of vertically spaced bearing elements 24 and 25 between which a bearing block 26 is positioned. The bearing elements 24 and 25 and the bearing block have aligned openings through which a king pin 27 extends and upon which the wheel fork is pivoted. The longitudinal axis of the wheel fork is preferably arranged to be inclined vertically and with its upper end in advance of its lower end. This insures that in landing the strain will be imposed upon the bearing faces of the elements 24 and 25 rather than to create a sheer strain upon the pin. The bearing block 26 is formed with an inclined side face 28 which extends upwardly and forwardly and receives the free end of a lower spring leaf 29. The spring lever 29 is bolted in its seated position by a suitable bolt 30 and forms a part of the tail skid spring 31 with which airplanes are commonly equipped. In the present instance, however, the tail skid shoe has been eliminated and the wheel fork and the bearing block have been substituted therefor. The tail skid spring 31 is bolted to the fuselage at 32 and its shoulders held by a bearing bracket 33. The arms 34 and 35 of the wheel fork are spaced from each other to receive a skid wheel 36. This wheel as here shown comprises a wheel element 37 upon which a pneumatic tire 38 is mounted. Suitably connected with the rudder torque tube 11 are steering arms 39 and 40. These arms are the usual arms connected to the control cables 41 and 42 which are attached at their forward ends to a rudder control lever 43.

In operation of the present invention the installation of a structure embodying the invention may be an entirely new and separate structure from that with which planes are now equipped, or it may be a remodeled structure utilizing the tail skid spring already installed upon the airplane. In the latter event the hardened tail skid shoe is removed and the end of the spring leaf 29 is ground so it will fit within the recessed seat 28 of the bearing block 26. The bearing block 26 and the spring 29 are securely bolted together by bolts 30 and usually the same bolt hole may be utilized as provided upon the tail skid for receiving a fastening for the tail skid shoe. The wheel fork 23 is then assembled upon the bearing block and the king pin 27 is placed in position to secure the wheel fork 23 in pivotal relation to the block 26. The rudder may be removed and after the scale has been cleaned from the inside of the torque tube 11 the mast post 40 is inserted in the lower end of the rudder tube and secured in position by bolts 41. The shock cords 19 are then applied by placing the hook portions 18 of their fittings through the eyes at the ends of levers 14, 15, 21 and 22. It is preferable to mount the fittings with the open sides of their hooks facing downwardly so that there will not be danger of disconnection of the fittings from the arms. When the structure is assembled as here shown the shock cords 19 will hold the arms 14 and 15 in yieldable parallel relation to the lever arms 21 and 22. Attention is directed to the fact that the normal position of longitudinal alignment of the king pin 27 is inclined forwardly with relation to the horizontal and in landing when the wheel 38 strikes the ground it will act through the wheel fork 23 and the bearing block 26 to flex the tail skid spring 31 by applying an upward force at the free rear end of the tail spring. This upward force will flex the spring. The yieldable action of the flexing spring, together with the cushioning action of the pneumatic tire 38 will absorb a great amount of the impact shock in landing and will prevent it from being transmitted to the fuselage, with the result that landing can be more easily made and without danger. In the event that irregularities in the ground over which the wheel 38 travels should exert uneven pressure against the wheel it would tend to pivot upon the king pin 27. This pivotal action will to a desirable extent be accommodated due to the ability of the shock cords 19 to flex longitudinally. The shock cords will also permit flexure of the tail springs 31 without placing undue strain upon the lever arms or the cord. When it is desired to proceed down the field after landing the rudder lever 43 may be manipulated to swing the rudder 12 around its vertical axis and since the rudder mast 40 and the lever arms 14 and 15 are fastened to the rudder torque tube 11 the lever arms 14 and 15 will swing in unison with the rudder. This movement will be imparted through the shock cords 19 to the fork lever arms 21 and 22 and will cause the wheel fork to swing around the axis of its king pin 27. Attention is directed to the fact that the horizontal rotating axis of the wheel 37 is in the rear of the vertical rotating axis of the wheel fork 23 around the king pin 27. This will give a caster effect so that the wheel will be inclined to "track" at the end of the skid spring 31. In the event the wheel encounters bumps in the ground over which it travels which would tend to swing the wheel fork on its axis and to swing the plane out of steering control the shock cords will act to absorb this force and hold the wheel fork so that the wheel will follow its steered course. It will also occur that any unbalanced force acting upon the wheel and being transmitted through its fork structure will be absorbed to a great extent within the shock cords and will not be transmitted to the controls. This insures easy operation of the control lever 43 and makes it possible for the pilot to steer the plane after landing without danger or difficulty.

It will thus be seen that the present invention when embodied in original installations or in remodeled installations upon airplanes, provides a simple and effective tail steering structure by which landing may be easily accomplished, and by which steering of the airplane after landing may be more simply and effectively brought about, than is now the case.

While I have shown the preferred form of my invention as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. In combination with an airplane, including a fuselage and horizontally swingable rudder, a cantilever spring connected at its forward end to the fuselage and having its free end extending rearwardly thereof, a bearing block secured in offset relation to, the free end of said spring, a wheel fork pivoted to said bearing block on an angularly disposed axis, a ground wheel carried thereby, lever means extending oppositely from said wheel fork, lever means extending oppositely from the rudder structure of the plane, and means connecting said levers whereby movement to swing the rudder will be imparted to swing the wheel fork, said connecting means being longitudinally yieldable.

2. In combination with an airplane, including a fuselage and horizontally swingable rudder, a cantilever spring connected at its forward end to the fuselage and having its free end extending rearwardly thereof, a bearing block secured in offset relation to the free end of said spring, a wheel fork pivoted to said bearing block on an angularly disposed axis, a ground wheel carried thereby, lever means extending oppositely from said wheel fork, lever means extending oppositely from the rudder structure of the plane, means connecting complementary levers whereby movement to swing the rudder will be imparted to swing the wheel fork, said connecting means being flexible and longitudinally resilient.

3. In combination with an airplane which includes a fuselage and a horizontally swinging rudder, a tail skid gear comprising a cantilever leaf spring secured by its forward end to the fuselage thereof and having its opposite end extending downwardly and rearwardly thereof, a bearing block secured in offset relation to the free end of said spring, a wheel fork pivoted to the bearing block upon an axis at substantially right angles to the longitudinal plane of said bearing block, the arms of said fork extending rearwardly of said pivotal axis, a ground wheel mounted between the arms of said wheel fork and rotatably supported thereby, lever arms extending oppositely from the rudder structure and at opposite sides of the longitudinal center of the spring, lever arms carried by the wheel fork and extending at opposite sides of the vertical axis thereof, and connecting members for transmitting motion between the lever arms at opposite sides of the center of the landing gear structure, said connecting means including fastening fittings engaging the arms and an intermediate flexible and resilient shock cord.

4. In combination with an airplane, a rudder landing gear comprising a spring plate member secured at its forward end to the fuselage of said plane and having its free end extending downwardly therefrom, a bearing block carried on the free end of said member and extending upwardly at an angle thereto, a wheel fork pivoted to said bearing block on an axis at substantially right angles to the plane of said bearing block, and a landing wheel mounted at the rear of said fork with its horizontal rotating axis disposed rearwardly of the rotating axis of the wheel fork, lever arms carried by the wheel fork and extending at opposite sides of the vertical axis thereof and connecting members for transmitting motion to the lever arms at the opposite sides of the center of the landing gear structure and said connecting means including intermediate flexible and resilient shock cords.

HARVEY N. MARTIN.